United States Patent
Nomura et al.

[11] Patent Number: 5,319,517
[45] Date of Patent: Jun. 7, 1994

[54] MULTILAYER CERAMIC CHIP CAPACITOR

[75] Inventors: Takeshi Nomura; Yukie Nakano, both of Chiba; Akira Satoh; Atsushi Hitomi, both of Akita, all of Japan

[73] Assignee: TDK Corporation, Tokyo, Japan

[21] Appl. No.: 38,695

[22] Filed: Mar. 29, 1993

[30] Foreign Application Priority Data

Mar. 27, 1992 [JP] Japan .................. 4-101788
Mar. 22, 1993 [JP] Japan .................. 5-086679
Mar. 22, 1993 [JP] Japan .................. 5-086680

[51] Int. Cl.$^5$ ............................. H01G 7/00
[52] U.S. Cl. ..................... 361/321.4; 29/25.42; 29/25.03; 501/137; 361/311; 361/321.2; 361/321.5; 252/520; 252/521
[58] Field of Search ............... 29/25.03, 25.42; 148/DIG. 14; 437/919; 501/137; 361/311, 321.1, 321.2, 321.3, 321.4, 321.5; 252/520, 521

[56] References Cited

U.S. PATENT DOCUMENTS

| 5,208,727 | 5/1993 | Okamoto et al. | 361/321.4 |
| 5,248,640 | 9/1993 | Sano et al. | 501/137 |
| 5,264,402 | 11/1993 | Sano et al. | 501/137 |

FOREIGN PATENT DOCUMENTS

| 0187960 | 7/1986 | European Pat. Off. | 501/137 |
| 0236608 | 9/1989 | Japan | 361/311 |
| 3-133116 | 6/1991 | Japan . | |

Primary Examiner—Olik Chaudhuri
Assistant Examiner—Ramamohan Rao Paladugu
Attorney, Agent, or Firm—Oblon, Spivak, McClelland, Maier & Neustadt

[57] ABSTRACT

The invention provides a multilayer ceramic chip capacitor having internal electrodes and dielectric layers, wherein a dielectric material containing a dielectric oxide having a composition of the following formula:

$$[(Ba_{1-x-y}Ca_xSr_y)O]_m(Ti_{1-z}Zr_z)O_2$$

wherein $0 \leq x \leq 0.25$, $0 \leq y \leq 0.05$, $0.1 \leq z \leq 0.3$, and $1.000 \leq m \leq 1.020$ and having added thereto an oxide of Mn and/or a compound which converts to the oxide upon firing in an amount of 0.01 to 0.5% by weight calculated as oxide (MnO), an oxide of Y and/or a compound which converts to the oxide upon firing in an amount of 0.05 to 0.5% by weight calculated as oxide ($Y_2O_3$), an oxide of V and/or a compound which converts to the oxide upon firing in an amount of 0.005 to 0.3% by weight calculated as oxide ($V_2O_5$), and an oxide of W and/or a compound which converts to the oxide upon firing in an amount of 0.005 to 0.3% by weight calculated as oxide ($WO_3$), and an internal electrode-forming material in the form of Ni or a Ni alloy are successively layered and fired. The multilayer ceramic chip capacitor allows for low-temperature firing and has a long accelerated life of insulation resistance.

23 Claims, 2 Drawing Sheets

MULTILAYER CERAMIC CHIP CAPACITOR

BACKGROUND OF THE INVENTION

1. Field of the Invention

This invention relates to a multilayer ceramic chip capacitor and more particularly, to a multilayer ceramic chip capacitor having improved dielectric layers.

2. Prior Art

Multilayer ceramic chip capacitors are generally fabricated by layering an internal electrode-forming paste and a dielectric layer-forming paste by sheeting, printing and similar techniques followed by integral co-firing.

Generally the internal electrodes have been formed of Pd and Pd alloys although the use of relatively inexpensive Ni and Ni alloys instead of expensive Pd is expanding.

Internal electrodes of Ni and Ni alloys are oxidized if fired in ambient air.

In this regard, after binder removal, firing is typically carried out at an oxygen partial pressure which is lower than the equilibrium oxygen partial pressure between Ni and NiO.

To consolidate the dielectric material in this case, it is a common practice to add $SiO_2$ sintering aid.

Another approach for preventing dielectric layers from lowering their insulation resistance due to reduction is Mn addition or Ca replacement.

Multilayer chip capacitors having internal electrodes of Ni or Ni alloys, however, suffer from the problems of an extremely short life of insulation resistance and low reliability as compared with multilayer chip capacitors having internal electrodes of Pd which are prepared by firing in ambient air.

Nevertheless, these problems were almost overcome by the multilayer ceramic chip capacitor which the inventors proposed and in which a dielectric material containing a dielectric oxide having a specific composition having added thereto a specific amount of at least one member selected from the group consisting of oxides of Y, Gd, Tb, Dy, Zr, V, Mo, Zn, Cd, Tl, Sn and P and/or compounds which will convert to the oxides upon firing, and an internal electrode-forming material in the form of Ni or Ni alloy are layered and fired (see Japanese Patent Application Kokai No. 133116/1991).

That is, it was found that by adding yttrium or similar elements, an about 2 to 10 times extended life and fairly improved reliability are obtained as compared with prior art chip capacitors free of such elements.

DISCLOSURE OF THE INVENTION

An object of the present invention is to provide a multi-layer ceramic chip capacitor which has a further increased life and further improved reliability as compared with the above-mentioned capacitors having yttrium or similar elements added thereto.

Another object of the present invention is to provide a multilayer ceramic chip capacitor wherein an initial loss of insulation resistance is minimized when dielectric layers have a thickness of 10 μm or less.

These and other objects are attained by the present invention which is defined below as (1) to (23).

(1) A multilayer ceramic chip capacitor having internal electrodes and dielectric layers, characterized in that a dielectric material containing a dielectric oxide having a composition of the following formula:

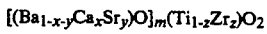

wherein $0 \leqq x \leqq 0.25$, $0 \leqq y \leqq 0.05$, $0.1 \leqq z \leqq 0.3$, and $1.000 \leqq m \leqq 1.020$ and having added thereto an oxide of Mn and/or a compound which converts to the oxide upon firing in an amount of 0.01 to 0.5% by weight calculated as oxide (MnO), an oxide of Y and/or a compound which converts to the oxide upon firing in an amount of 0.05 to 0.5% by weight calculated as oxide ($Y_2O_3$), an oxide of V and/or a compound which converts to the oxide upon firing in an amount of 0.005 to 0.3% by weight calculated as oxide ($V_2O_5$), and an oxide of W and/or a compound which converts to the oxide upon firing in an amount of 0.005 to 0.3% by weight calculated as oxide ($WO_3$), and an internal electrode-forming material in the form of Ni or a Ni alloy are successively layered and co-fired.

(2) The multilayer ceramic chip capacitor of claim 1 wherein the dielectric material has further added thereto up to 0.25% by weight of $SiO_2$.

(3) The multilayer ceramic chip capacitor of claim 1 or 2 wherein the dielectric material has further added thereto at least one oxide of Eu and Mo and/or a compound which converts to the oxide upon firing in an amount of up to 0.3% by weight calculated as oxide.

(4) The multilayer ceramic chip capacitor of any one of claims 1 to 3 wherein each said dielectric layer consists of grains and a grain boundary phase and the ratio of the area of the grain boundary phase in a cross section of said dielectric layer is up to 2%.

(5) The multilayer ceramic chip capacitor of claim 4 wherein said grain boundary phase is an oxide phase containing oxides of Mn, Y, V and W.

(6) A multilayer ceramic chip capacitor which is prepared by successively layering and co-firing a dielectric material having additives added to a matrix of the following formula:

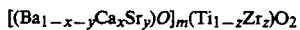

wherein $0 \leqq x \leqq 0.25$, $0 \leqq y \leqq 0.05$, $0.1 \leqq z \leqq 0.3$, and $1.000 \leqq m \leqq 1.020$, said additives including an oxide of Mn and/or a compound which converts to the oxide upon firing, an oxide of Y and/or a compound which converts to the oxide upon firing, an oxide of V and/or a compound which converts to the oxide upon firing, and an oxide of W and/or a compound which converts to the oxide upon firing, and an internal electrode-forming material in the form of Ni or a Ni alloy, wherein said additive powders have a mean particle size of up to 3 μm.

(7) The multilayer ceramic chip capacitor of claim 6 wherein said additive powders have a maximum particle size of up to 5 μm.

(8) The multilayer ceramic chip capacitor of claim 6 or 7 wherein said additives have a mean particle size which is within 5 times the mean particle size of the matrix.

(9) The multilayer ceramic chip capacitor of claim 8 wherein said additives have a mean particle size which is within 3 times the mean particle size of the matrix.

(10) The multilayer ceramic chip capacitor of claim 6 or 7 wherein said additives have a maximum particle size which is within 3 times the maximum particle size of the matrix.

(11) The multilayer ceramic chip capacitor of claim 6 wherein said oxide of Mn and/or said compound which converts to the oxide upon firing is added in an amount of 0.01 to 0.5% by weight calculated as oxide (MnO), said oxide of Y and/or said compound which converts to the oxide upon firing is added in an amount of 0.05 to 0.5% by weight calculated as oxide ($Y_2O_3$), said oxide of V and/or said compound which converts to the oxide upon firing is added in an amount of 0.005 to 0.3% by weight calculated as oxide ($V_2O_5$), and said oxide of W and/or said compound which converts to the oxide upon firing is added in an amount of 0.005 to 0.3% by weight calculated as oxide ($WO_3$).

(12) The multilayer ceramic chip capacitor of claim 6 or 11 wherein the dielectric material has further added thereto up to 0.25% by weight of $SiO_2$.

(13) The multilayer ceramic chip capacitor of claim 6, 11 or 12 wherein the dielectric material has further added thereto at least one oxide of Eu and Mo and/or a compound which converts to the oxide upon firing in an amount of up to 0.3% by weight calculated as oxide.

(14) The multilayer ceramic chip capacitor of any one of claims 6 to 13 wherein each said dielectric layer consists of grains and a grain boundary phase and the ratio of the area of the grain boundary phase in a cross section of said dielectric layer is up to 2%.

(15) The multilayer ceramic chip capacitor of claim 14 wherein said grain boundary phase is an oxide phase containing oxides of Mn, Y, V and W.

(16) A multilayer ceramic chip capacitor which is prepared by successively layering and co-firing a dielectric material having additives added to a matrix of the following formula:

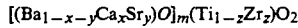

wherein $0 \leq x \leq 0.25$, $0 \leq y \leq 0.05$, $0.1 \leq z \leq 0.3$, and $1.000 \leq m \leq 1.020$, said additives including an oxide of Mn and/or a compound which converts to the oxide upon firing, an oxide of Y and/or a compound which converts to the oxide upon firing, an oxide of V and/or a compound which converts to the oxide upon firing, an oxide of W and/or a compound which converts to the oxide upon firing, and $Al_2O_3$ sintering aid, and an internal electrode-forming material in the form of Ni or a Ni alloy.

(17) The multilayer ceramic chip capacitor of claim 16 wherein the $Al_2O_3$ sintering aid is added in an amount of 0.005 to 0.5% by weight.

(18) The multilayer ceramic chip capacitor of claim 16 wherein the $Al_2O_3$ sintering aid is added in an amount of 0.01 to 0.3% by weight.

(19) The multilayer ceramic chip capacitor of claim 16 wherein the $Al_2O_3$ sintering aid is added in an amount of 0.01 to 0.15% by weight.

(20) The multilayer ceramic chip capacitor of claim 16 wherein said oxide of Mn and/or said compound which converts to the oxide upon firing is added in an amount of 0.01 to 0.5% by weight calculated as oxide (MnO), said oxide of Y and/or said compound which converts to the oxide upon firing is added in an amount of 0.05 to 0.5% by weight calculated as oxide ($Y_2O_3$), said oxide of V and/or said compound which converts to the oxide upon firing is added in an amount of 0.005 to 0.3% by weight calculated as oxide ($V_2O_5$), and said oxide of W and/or said compound which converts to the oxide upon firing is added in an amount of 0.005 to 0.3% by weight calculated as oxide ($WO_3$).

(21) The multilayer ceramic chip capacitor of claim 16 or 20 wherein the dielectric material has further added thereto at least one oxide of Eu and Mo and/or a compound which converts to the oxide upon firing in an amount of up to 0.3% by weight calculated as oxide.

(22) The multilayer ceramic chip capacitor of any one of claims 16 to 21 wherein each said dielectric layer consists of grains and a grain boundary phase and the ratio of the area of the grain boundary phase in a cross section of said dielectric layer is up to 2%.

(23) The multilayer ceramic chip capacitor of claim 22 wherein said grain boundary phase is an oxide phase containing oxides of Mn, Y, V and W.

ILLUSTRATIVE CONSTRUCTION

The illustrative construction of the invention is described in further detail.

Figure 1:
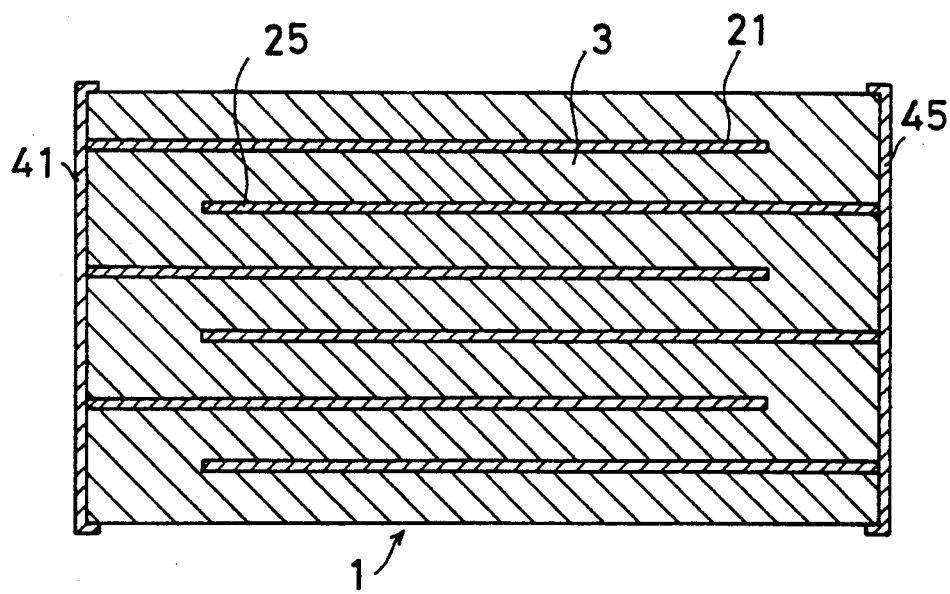
FIG. 1 is a cross section of one exemplary multilayer ceramic chip capacitor according to the invention.

Referring to FIG. 1, there is illustrated a multilayer ceramic chip capacitor according to one preferred embodiment of the invention. The multilayer chip capacitor 1 includes alternately stacked internal electrodes 21, 25 and dielectric layers 3 and a pair of external electrodes 41, 45 connected to the respective internal electrodes 21, 25.

According to the invention, the internal electrodes 21, 25 are formed of Ni or a Ni alloy, the Ni alloy being preferably a nickel alloy consisting of at least 95% by weight of Ni and at least one element of Mn, Cr, Co, Al, etc.

These lead to a satisfactory life and reliability according to the invention.

It is to be noted that Ni or Ni alloys may contain up to 0.1% by weight of P or the like as a trace component.

Parameters associated with the internal electrodes 21, 25 including thickness may be suitably determined in accordance with a particular purpose and application although the thickness is typically about 1 to 5 $\mu$m, especially about 2 to 3 $\mu$m.

The dielectric layer 3 consists of grains and a grain boundary phase.

The material of which the dielectric layer 3 is made contains a dielectric oxide having a composition of the following formula.

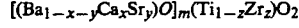

In the formula, x is from 0 to 0.25, preferably from 0.05 to 0.10, y is from 0 to 0.05, preferably from 0 to 0.01, z is from 0.1 to 0.3, preferably from 0.15 to 0.20, and m is from 1.000 to 1.020, preferably from 1.002 to 1.015.

According to the invention, the material further contains manganese oxide and/or a compound which converts to the oxide upon firing in an amount of 0.01 to 0.5% by weight, preferably 0.1 to 0.4% by weight, more preferably 0.2 to 0.4% by weight calculated as oxide MnO, yttrium oxide and/or a compound which converts to the oxide upon firing in an amount of 0.05 to 0.5% by weight, preferably 0.08 to 0.45% by weight, more preferably 0.2 to 0.4% by weight calculated as oxide $Y_2O_3$, vanadium oxide and/or a compound which converts to the oxide upon firing in an amount of 0.005 to 0.5% by weight, preferably 0.01 to 0.2% by weight, more preferably 0.01 to 0.1% by weight calculated as oxide $V_2O_5$, and tungsten oxide and/or a compound which converts to the oxide upon firing in an amount of 0.005 to 0.3% by weight, preferably 0.01 to 0.2% by weight, more preferably 0.01 to 0.1% by weight calculated as oxide $WO_3$.

Preferably, the material may further contain $SiO_2$ or $Al_2O_3$ as a sintering aid.

In this regard, the content of $SiO_2$ is preferably up to about 0.25% by weight, especially about 0.05 to 0.25% by weight. The content of $Al_2O_3$ is 0.005 to 0.5% by weight, preferably 0.01 to 0.3% by weight, more preferably 0.01 to 0.15% by weight.

It is rather desirable to use $Al_2O_3$ as the sintering aid because multilayer ceramic chip capacitors which are improved in the accelerated life of insulation resistance are obtained by low-temperature firing.

Also there may be contained up to about 0.3% by weight of at least one of Eu oxides and Mo oxides. There may be further contained up to about 0.5% by weight of a Ni oxide, Mg oxide, Co oxide, Hf oxide, etc.

None of the advantages of the invention are established with oxides of elements other than the above-specified elements and addition amounts outside the above-specified ranges.

In this regard, the additive powders as a whole should desirably have a mean particle size of up to 3.0 μm and additionally, a maximum particle size of up to 5 μm. Further the additive powders as a whole should desirably have a mean particle size which is within 5 times the mean particle size of the matrix powder. Moreover, the additive powders should desirably have a maximum particle size which is within 3 times the maximum particle size of the matrix powder. The additive powders should desirably have a mean particle size of 0.3 to 1.5 μm and a maximum particle size of up to 3.5 μm. Desirably the additive powders are previously comminuted so as to meet the above-mentioned requirements. Where additive powders larger than the selected particle size are used, chip capacitors having thin dielectric layers have the problem that the local segregation of the additives is found in the dielectric layers which would cause an initial loss of insulation resistance. However, by comminuting additive powders, especially by selecting a maximum particle size within the above-mentioned range, the rejection rate of initial insulation resistance of the resulting chip capacitors is minimized. Especially by selecting the maximum particle size of the additives within the above-mentioned range, the rejection rate of initial insulation resistance of the resulting chip capacitors is dramatically minimized. It is to be noted that the matrix powder should desirably have a mean particle size of up to 1.5 μm and a maximum particle size of up to 3 μm.

Parameters associated with the dielectric layers 3 including the number of layers and thickness may be suitably determined in accordance with a particular purpose and application.

Also preferably, the grains in the dielectric layers 3 have a mean grain size of about 1 to 5 μm.

The ratio of the area of the grain boundary phase, which is the remainder other than the grains forming the dielectric layer 3, in an arbitrary cross section of the dielectric layer 3 is preferably up to about 2%, more preferably about 0.5 to 1.0%.

Beyond this range, there is a likelihood of reducing the life and lowering the reliability.

With an extremely low area ratio, there is a tendency that formation of dielectric layers 3 is difficult and consolidation of dielectric layers 3 is insufficient.

Understandably, the area ratio of the grain boundary phase may be determined from a photograph taken using a scanning electron microscope.

Some components of the grain boundary phase are oxides of materials introduced as Mn, Y, V and W components.

The external electrodes 41, 45 typically use Cu and Cu alloys or Ni and Ni alloys.

Understandably, Ag and Ag-Pd alloys are, of course, useful.

The thickness of the external electrodes 41, 45 is arbitrary and may be determined in accordance with a particular purpose and application although it typically ranges from about 10 to 50 μm.

The shape and size of the multilayer chip capacitor 1 may be determined in accordance with a particular purpose and application. For example, rectangular shape capacitors are generally sized 1.6–3.2 mm×0.8–1.6 mm×0.6–1.2 mm.

Preferably the multilayer ceramic chip capacitor of the present invention is fabricated as follows.

First prepared are a paste for forming the dielectric layers 3, a paste for forming the internal electrodes 21, 25, and a paste for forming the external electrodes 41, 45.

The paste for forming the dielectric layers 3 is obtained by mixing previously comminuted additives in the form of single or composite oxides of Ca, Mn, Y, V, W, Mo, Eu, Si, etc. and a matrix-forming material selected from $BaTiO_3$, $BaZrO_3$, $CaTiO_3$, $CaZrO_3$, etc. in accordance with the aforementioned dielectric oxide composition, drying the mixture, and adding thereto additives such as binders, plasticizers, dispersants, and solvents.

The above-mentioned additives of Ca or the like may be replaced by compounds which will convert to oxides upon firing, for example, carbonates, sulfates, nitrates, oxalates, and organometallic compounds.

Additionally, both an oxide and a compound which converts to the oxide upon firing may be used.

The starting raw material for forming the matrix need not take the form of $BaTiO_3$, $BaZrO_3$, $CaTiO_3$, and $CaZrO_3$ specified above, but oxides of Ti, Ba, Zr, Ca, etc. or compounds which convert to the respective oxides upon firing may be used in accordance with the desired dielectric oxide composition.

From these source powders, a dielectric material is prepared by the following procedure, for example.

First the starting raw materials are blended in a predetermined ratio and wet milled, for example, in a ball mill.

Then the mixture is dried, for example, by a spray dryer, and then calcined to form a dielectric oxide of the above-defined formula.

Calcination is generally effected in air at 800° to 1300° C. for about 2 to 10 hours.

Thereafter, the product is ground in a jet mill or ball mill until a predetermined particle size is reached, obtaining a dielectric material.

In the preparation of the dielectric layer-forming paste, any desired additives such as binders, plasticizers, dispersants, and solvents may be used. Addition of glass frit is also acceptable.

Examples of the binder include ethyl cellulose, abietic acid resin, and polyvinyl butyral;

examples of the plasticizer include abietic acid derivatives, diethyl oxalate, polyethylene glycol, polyalkylene glycols, phthalic esters, and dibutyl phthalate;

examples of the dispersant include glycerin, octadecylamine, trichloroacetic acid, oleic acid, octadiene, ethyl oleate, glycerol monooleate, glycerol trioleate, glycerol tristearate, and menthadiene oil;

examples of the solvent include toluene, terpineol, butyl carbitol and methyl ethyl ketone.

In preparing the paste, the proportion of the dielectric material in the entire composition is about 50 to 80% by weight while using about 2 to 5% by weight of the binder, about 0.01 to 5% by weight of the plasticizer, about 0.01 to 5% by weight of the dispersant, and about 20 to 50% by weight of the solvent.

A paste or slurry is obtained by mixing the dielectric material with these additives and kneading the mixture, for example, in a three-roll mill.

The paste for forming the internal electrodes 21, 25 is prepared using Ni or a Ni alloy or a mixture thereof as a conductor material.

The conductor material may be spherical or flake in shape or a mixture of such shapes since its shape is not critical.

Any conductor material having a mean particle size of about 0.1 to 10 $\mu$m, especially about 0.1 to 1 $\mu$m may be used.

An organic vehicle contains a binder and a solvent.

Useful as the binder are any known binders such as ethyl cellulose, acrylic resins, and butyral resins.

The binder content is about 1 to 5% by weight.

Useful as the solvent are any known solvents such as terpineol, butyl carbitol, and kerosene.

The solvent content is about 20 to 55% by weight.

Additionally, if desired, there may be added in an amount of up to about 10% by weight in total dispersants such as sorbitan fatty acid esters and glycerin fatty acid esters, plasticizers such as dioctyl phthalate, dibutyl phthalate, and butyl butylphthalylglycolate, and various ceramic powders such as dielectric materials and insulating materials for the purposes of anti-delamination and controlled sintering.

Also it is effective to add organometallic resinates.

The paste for forming the external electrodes 41, 45 may be a conventional paste containing the aforementioned conductor material powder.

Using the internal electrode-forming paste and dielectric layer-forming paste thus obtained, layers are successively formed by a printing, transfer or green sheet technique.

Then the laminate is cut to a predetermined size to form a green chip. The green chip is removed of the binder and fired. Heat treatment is then carried out for re-oxidation of the dielectric layers 3.

Binder removal may be carried out under conventional conditions, preferably under the following conditions.

Heating rate: 5°–300° C./hour, especially 10°–50° C./hour

Holding temperature: 200°–400° C., especially 250°–350° C.

Holding time: ½–5 hours, especially 1–3 hours

Atmosphere: air

Firing is preferably carried out at an oxygen partial pressure of up to $10^{-7}$ atm., especially $10^{-7}$ to $10^{-13}$ atm.

Above the range, the internal electrodes 21, 25 are likely to oxidize. At an extremely low oxygen partial pressure, the electrode material tends to be abnormally sintered and disconnected.

Remaining conditions for sintering are preferably as follows.

Heating rate: 50°–500° C./hour, especially 200°–300° C./hour

Holding temperature: 1200°–1400° C., especially 1250°–1350° C.

Holding time: ½–8 hours, especially 1–3 hours

Cooling rate: 50°–500° C./hour, especially 200°–300° C./hour

The atmospheric gas is preferably a humidified mixture of $N_2$ and $H_2$ gases.

Heat treatment is preferably carried out with the holding or maximum temperature set at 800° to 1200° C., more preferably 900° to 1100° C.

Below the range, there is a likelihood that the life be reduced because of short oxidation of the dielectric material. Above the range, there is a likelihood that Ni as the internal electrodes be not only oxidized to reduce the capacity, but also reacted with the dielectric material to reduce the life.

During the heat treatment, the oxygen partial pressure is preferably at least $10^{-8}$ atm., more preferably $10^{-4}$ to $10^{-7}$ atm.

Below the range, it is difficult to re-oxidize the dielectric layers 3 and oxide layers 4 whereas above the range, the internal electrodes 21, 25 are likely to oxidize.

Remaining conditions for heat treatment are preferably as follows.

Holding time: 0–6 hours, especially 2–5 hours

Cooling rate: 50°–500° C./hour, especially 100°–300° C./hour

The atmospheric gas is preferably humidified $N_2$ gas.

For humidifying $N_2$ gas or mixture, a wetter may be used, for example. In this regard, water temperature is preferably about 0° to 75° C.

The foregoing binder removal, firing and heat treatment may be carried out either continuously or separately.

The thus obtained sintered body is polished at end faces by barrel tumbling and sand blasting, for example, before the external electrode-forming paste is baked to form external electrodes 41, 45.

If necessary, pads are formed on the external electrodes 41, 45 as by plating.

The multilayer ceramic chip capacitors of the invention use a barium titanate system dielectric material having specific compounds added thereto.

They are prepared by removing the binder and carrying out firing and heat treatment under predetermined conditions.

The multilayer ceramic chip capacitors of the invention have a life which is increased about 1.5 times or more over the life of conventional chip capacitors having added thereto yttrium or the like. Therefore, a satisfactory life is maintained even when the thickness of dielectric layers is reduced from the conventional thickness 10 to 15 $\mu$m to 6 $\mu$m or less. By comminuting the additives to a mean particle size of 3 $\mu$m or less, the initial loss of insulation resistance is minimized, greatly contributing to the fabrication of compact size, high capacity multilayer ceramic chip capacitors. Furthermore, addition of $SiO_2$ or $Al_2O_3$ as a sintering aid allows for low-temperature firing and especially the use of $Al_2O_3$ improves the accelerated life of insulation resistance.

EXAMPLE

Examples of the invention are given below by way of illustration.

EXAMPLE 1

The starting raw materials used for forming a matrix were $BaTiO_3$, $BaZrO_3$ and $CaTiO_3$ resulting from liquid phase synthesis.

The additives used were $MnCO_3$, $Y_2O_3$, $V_2O_5$, $WO_3$, $SiO_2$, $MoO_3$, $Eu_2O_3$, etc. and the amounts of $MnCO_3$, $Y_2O_3$, $V_2O_5$, $WO_3$, $MoO_3$, and $Eu_2O_3$ were changed as shown in Table 1. For each run, the additives were milled for 24 hours in a ball mill to form a slurry of the additives having a mean particle size of up to 3 $\mu$m and a maximum particle size of up to 5 $\mu$m. To the additive slurry were added the $BaTiO_3$, $BaZrO_3$ and $CaTiO_3$. Each mixture was wet milled for 16 hours in a ball mill, and dried. There were obtained twenty one (21) samples of dielectric material. Note that sample Nos. 1 to 13 are inventive examples and sample Nos. 14 to 21 are comparative examples.

TABLE 1

| Sample | MnO (wt %) | $Y_2O_3$ (wt %) | $V_2O_5$ (wt %) | $WO_3$ (wt %) | others (wt %) | IR life (h) | Initial properties (20° C.) | | |
|---|---|---|---|---|---|---|---|---|---|
| | | | | | | | C(nF) | tan δ (%) | IR (Ω) |
| 1  | 0.2  | 0.1 | 0.05  | 0.05 |             | 8.7  | 205 | 4.8  | $5 \times 10^{10}$ |
| 2  | 0.2  | 0.2 | 0.05  | 0.05 |             | 12.4 | 193 | 4.1  | $7 \times 10^{10}$ |
| 3  | 0.2  | 0.3 | 0.05  | 0.05 |             | 14.6 | 170 | 3.7  | $7 \times 10^{10}$ |
| 4  | 0.2  | 0.4 | 0.05  | 0.05 |             | 13.3 | 136 | 2.9  | $3 \times 10^{10}$ |
| 5  | 0.1  | 0.3 | 0.05  | 0.05 |             | 9.3  | 218 | 5.8  | $1 \times 10^{10}$ |
| 6  | 0.3  | 0.3 | 0.05  | 0.05 |             | 15.3 | 140 | 2.8  | $8 \times 10^{10}$ |
| 7  | 0.2  | 0.3 | 0.01  | 0.05 |             | 12.7 | 173 | 4.3  | $9 \times 10^{10}$ |
| 8  | 0.2  | 0.3 | 0.1   | 0.05 |             | 15.0 | 154 | 3.9  | $7 \times 10^{10}$ |
| 9  | 0.2  | 0.3 | 0.2   | 0.05 |             | 10.1 | 125 | 3.5  | $8 \times 10^{10}$ |
| 10 | 0.2  | 0.3 | 0.005 | 0.01 |             | 12.9 | 170 | 3.7  | $8 \times 10^{10}$ |
| 11 | 0.2  | 0.3 | 0.05  | 0.1  |             | 13.7 | 162 | 3.1  | $7 \times 10^{10}$ |
| 12 | 0.2  | 0.3 | 0.05  | 0.05 | $MoO_3$ 0.05   | 13.8 | 220 | 5.1  | $9 \times 10^{10}$ |
| 13 | 0.2  | 0.3 | 0.05  | 0.05 | $Eu_2O_3$ 0.05 | 18.2 | 158 | 5.4  | $4 \times 10^{10}$ |
| 14 | 0.2  | 0   | 0     | 0    |             | 0.01 | 251 | 5.7  | $8 \times 10^{9}$ |
| 15 | 0.2  | 0.3 | 0     | 0    |             | 4.1  | 206 | 4.4  | $5 \times 10^{10}$ |
| 16 | 0.2  | 0   | 0.04  | 0.05 |             | 0.18 | 232 | 5.1  | $2 \times 10^{10}$ |
| 17 | 0    | 0.3 | 0.04  | 0.05 |             | 0.37 | 87  | 2.6  | $1 \times 10^{8}$ |
| 18 | 1.0  | 0.3 | 0.04  | 0.05 |             | 3.8  | 113 | 5.8  | $2 \times 10^{10}$ |
| 19 | 0.2  | 0.3 | 0.75  | 0.05 |             | 2.7  | 115 | 3.4  | $7 \times 10^{10}$ |
| 20 | 0.2  | 0.8 | 0.04  | 0.05 |             | 4.9  | 88  | 8.6  | $4 \times 10^{8}$ |
| 21 | 0.2  | 1.0 | 1.0   | 1.0  |             | 1.1  | 59  | 15.1 | $7 \times 10^{7}$ |

Matrix composition: $[(Ba_{0.989}Ca_{0.01}Sr_{0.001})O]_{1.004}(Ti_{0.92}Zr_{0.18})O_2$ From each of these dielectric materials, a dielectric layer-forming paste was prepared by mixing it with additives at the blending ratio shown below in a ball mill charged with alumina balls, thereby forming a slurry.

| Dielectric material:   | 100 parts by weight  |
|---|---|
| Acrylic resin:         | 5.0 parts by weight  |
| Benzylbutyl phthalate: | 2.5 parts by weight  |
| Mineral spirits:       | 6.5 parts by weight  |
| Acetone:               | 4.0 parts by weight  |
| Trichloroethane:       | 20.5 parts by weight |
| Methylene chloride:    | 41.5 parts by weight |

Separately, an internal electrode-forming paste was prepared by milling the following components in the blending ratio shown below in a three-roll mill, thereby forming a slurry.

| Ni: | 44.6% by weight |
|---|---|
| Terpineol:      | 52% by weight   |
| Ethyl cellulose:| 3% by weight    |
| Benzotriazole:  | 0.4% by weight  |

Using these pastes, a multilayer ceramic chip capacitor 1 as shown in FIG. 1 was fabricated as follows.

First using the dielectric layer-forming paste, a sheet of 10 $\mu$m thick was formed on a carrier film. Using the internal electrode-forming paste, an internal electrode was printed thereon. A plurality of thus formed sheets were stripped from the carrier films, stacked one on top of another, and bonded under pressure.

The number of dielectric layers 3 was four layers.

The stack was cut to a predetermined size and then continuously subjected to binder removal, firing and heat treatment under the following conditions.

Binder removal

Heating rate: 20° C./hr.
Holding temperature: 300° C.
Holding time: 2 hours
Atmospheric gas: air Firing Heating rate: 200° C./hr.
Holding temperature: 1340° C.
Holding time: 2 hours
Cooling rate: 300° C./hr.
Atmospheric gas: humidified $N_2$ and $H_2$ gas mixture
Oxygen partial pressure: $10^{-8}$ atm.

Heat treatment

Holding temperature: 1000° C.
Holding time: 2 hours
Cooling rate: 300° C./hr.
Atmospheric gas: humidified $N_2$ gas
Oxygen partial pressure: $10^{-7}$ atm.

For humidifying the atmospheric gases, a wetter was used at a water temperature of 5° to 75° C.

The sintered body thus obtained was polished at end faces by sand blasting and In-Ga alloy was applied to form testing electrodes.

The thus prepared multilayer ceramic chip capacitor 1 had dimensions 3.2 mm×1.6 mm×0.6 mm, the dielectric layers 3 were 6 μm thick, and the internal electrodes 21, 25 were 2.5 μm thick. The dielectric layers 3 contained a dielectric oxide of a composition represented by the formula:

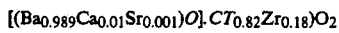

$[(Ba_{0.989}Ca_{0.01}Sr_{0.001})O] \cdot CT_{0.82}Zr_{0.18})O_2$ as a main ingredient. Note that strontium found in this composition resulted from an impurity incidentally contained in the raw materials.

Figure 2:
FIG. 2 is a photomicrograph of a polished cross section of a dielectric layer in a sintered body constituting one exemplary multilayer ceramic chip capacitor according to the invention, showing a grain structure.

The photograph of FIG. 2 shows one exemplary fine structure appearing on a polished surface of the dielectric layer 3 in the sintered body or multilayer ceramic chip capacitor 1. The sintered body had a grain size of 1 to 3 μm and the grain boundary had a thickness of up to 5 nm. Table 2 shows element distributions within grains, at the grain boundary and the triple point as analyzed by means of a transmission type scanning electron microscope. Note that in Table 2, A/B is a ratio of the component of the formula at A site to that at B site. For all the samples, the area ratio of the grain boundary phase in a cross section of the dielectric layer was up to 2%.

Using a high resistance meter (HP-4329A), these samples were measured for initial insulation resistance, from which a rejection rate was calculated, with the results shown in Table 3. Note that sample Nos. 1 to 5 are inventive examples and sample Nos. 6 and 7 are comparative examples.

TABLE 3

| Sample | Additive's mean particle size (μm) | Additive's maximum particle size (μm) | Rejection rate of initial insulation resistance (%) |
|---|---|---|---|
| 1 | 0.2 | 1.9 | 0 |
| 2 | 0.4 | 2.5 | 0 |
| 3 | 1.0 | 3.3 | 0.5 |
| 4 | 2.2 | 3.8 | 9.4 |
| 5 | 2.5 | 4.1 | 12 |
| 6 | 3.2 | 5.8 | 72 |
| 7 | 3.6 | 7.2 | 100 |

As seen from Table 3, when the matrix powder and the additive powder had a mean particle size and a maximum particle size within the scope of the invention, the rejection rate was 12% at maximum. For the additive having a mean particle size of 3.6 μm and a maximum particle size of 7.2 μm outside the scope of the invention, the rejection rate was 100%. In samples 1

TABLE 2

| | Ti | Ba | Zr | Al | Si | Ca | Mn | Y | Ni | W | V | O | A/B |
|---|---|---|---|---|---|---|---|---|---|---|---|---|---|
| | | | | | | | at % | | | | | | |
| Within grain | 14.5 | 19.7 | 3.47 | 0.65 | 0.54 | 0.14 | 0.21 | 0.13 | 0.44 | 0.17 | 0.77 | 59.3 | 1.104 |
| Grain boundary | 15.8 | 18.9 | 3.40 | 0.31 | 0.22 | 0.18 | 0.27 | 0.15 | 0.31 | 0.08 | 0.56 | 59.7 | 0.994 |
| Triple point | 2.97 | 14.4 | 0.43 | 1.34 | 12.9 | 1.04 | 4.35 | 2.57 | 1.78 | 0.21 | 0.56 | 57.2 | 4.54 |

These capacitors were then examined by an accelerated life test at a temperature of 200° C. and a voltage of DC 60 volts and determined for initial values (at room temperature) of C (nF), tanδ (%), and IR (Ω), with the results shown in Table 1.

As seen from Table 1, the multilayer ceramic chip capacitors of the invention offer improved initial properties and have a longer life than the conventional chip capacitors having yttrium or the like added thereto. Consequently, high reliability is obtained.

EXAMPLE 2

Powders of $BaTiO_3$, $BaZrO_3$ and $CaTiO_3$ for forming a matrix were milled in a wet ball mill to a mean particle size of 0.5 μm and a maximum particle size of 1 μm.

As the additives, 0.20% by weight (based on the entire dielectric material, same below) of $MnCO_3$, 0.30% by weight of $Y_2O_3$, 0.04% by weight of $V_2O_5$, and 0.05% by weight of $WO_3$ were weighed. All these additives were mixed and comminuted in a wet ball mill until they reached a mean particle size and a maximum particle size as shown in Table 3.

Thereafter, using the thus obtained matrix powder and additive powder, seven (7) samples of multilayer ceramic chip capacitor were fabricated as in Example 1. The thus prepared multilayer ceramic chip capacitors 1 had dimensions 3.2 mm×1.6 mm×0.6 mm, the dielectric layers 3 were 6 μm thick, and the internal electrodes 21, 25 were 2.5 μm thick.

to 3 in which the mean particle size of the additive was within 2 times the mean particle size of the matrix powder, prominent advantages were obtained as seen from an initial insulation rejection rate of 0.5% at maximum.

Using an additive powder having a mean particle size and a maximum particle size within the scope of the invention and a matrix powder having a mean particle size of up to 1.5 μm and a maximum particle size of up to 3.0 μm such that the mean particle size of the additive was within 5 times the mean particle size of the matrix powder, multilayer ceramic chip capacitors were prepared and examined by similar tests to find equivalent results.

EXAMPLE 3

The starting raw materials used were $BaTiO_3$, $BaZrO_3$ and $CaTiO_3$ resulting from liquid phase synthesis. The $BaTiO_3$, $BaZrO_3$ and $CaTiO_3$ powders had a mean particle size of 0.5 μm and a maximum particle size of 1.5 μm.

Seven (7) samples of multilayer ceramic chip capacitor were fabricated by the same procedure as Example 1 except that 0.20% by weight of $MnCO_3$, 0.30% by weight of $Y_2O_3$, 0.04% by weight of $V_2O_5$, 0.05% by weight of $WO_3$, and a varying amount as shown in Table 4 of additive $Al_2O_3$ or $SiO_2$ were added to a matrix material of the same composition as in Example 1. Note that sample Nos. 1 to 4 and 7 are inventive examples and sample Nos. 5 and 6 are comparative examples.

TABLE 4

| | Al$_2$O$_3$ (wt %) | Firing temperature (°C.) | IR life (h) | $\epsilon_s$ (25° C.) | Strength $\sigma_{b3}$ (kgf/mm$^2$) | Remarks |
|---|---|---|---|---|---|---|
| Sample 1 | 0.05 | 1260 | 123.7 | 9200 | 10.3 | |
| | | 1300 | 102.0 | 11000 | 13.8 | |
| | | 1340 | 88.9 | 12500 | 15.7 | |
| Sample 2 | 0.10 | 1260 | 114.8 | 10200 | 12.8 | |
| | | 1300 | 95.0 | 12700 | 14.2 | |
| | | 1340 | 54.6 | 14300 | 15.0 | |
| Sample 3 | 0.20 | 1260 | 88.8 | 9100 | 13.5 | |
| | | 1300 | 77.3 | 11600 | 13.2 | |
| | | 1340 | 33.0 | 14400 | 13.8 | |
| Sample 4 | 0.40 | 1260 | 62.3 | 7200 | 13.2 | |
| | | 1300 | 27.8 | 10100 | 11.6 | |
| | | 1340 | 9.1 | 16000 | 12.7 | |
| Sample 5 | 0 | 1260 | 77.6 | 5000 | 6.9 | |
| | | 1300 | 170.0 | 9700 | 12.8 | |
| | | 1340 | 137.0 | 11800 | 13.3 | |
| Sample 6 | 0.80 | 1260 | 0.2 | 3100 | 11.3 | abnormal grain growth |
| | | 1300 | 0.1 | 6700 | 7.3 | |
| | | 1340 | 0 | 20900 | 8.5 | |
| Sample 7 | SiO$_2$ (0.1 wt %) | 1260 | 26.7 | 9900 | 10.5 | |
| | | 1300 | 21.8 | 11400 | 11.7 | |
| | | 1340 | 12.7 | 12800 | 12.8 | |

These capacitors were then examined by an accelerated life test (IR life, hour) at a temperature of 200° C. and a voltage of DC 150 volts and determined for $\xi_s$ at 25° C. and mechanical strength $\sigma_{b3}$ (kgf/mm$^2$), with the results shown in Table 4. The mechanical strength was evaluated by a three-point bending test (fine ceramics bending strength test JIS R 1601).

As seen from Table 4, where Al$_2$O$_3$ (added in an amount of 0.005 to 0.5% by weight based on the entire dielectric material) or SiO$_2$ were used as the sintering aid, multilayer ceramic chip capacitors of the invention had a mechanical strength $\sigma_{b3}$ of 10.3 kgf/mm$^2$ or more even when fired at temperatures as low as 1260° C. This indicates improved sintering capability at lower temperatures as compared with the sintering aid-free samples having a mechanical strength $\sigma_{b3}$ of 6.9 kgf/mm$^2$. A comparison between samples having 0.1% by weight of the sintering aid added revealed that the use of Al$_2$O$_3$ was preferred to SiO$_2$ because the life was 54.6 hours at minimum with the use of Al$_2$O$_3$, but only 26.7 hours at maximum with the use of SiO$_2$.

EXAMPLE 4

Twenty (20) samples of multilayer ceramic chip capacitor were prepared as in Example 3 except that the amount of Al$_2$O$_3$ was fixed to 0.10% by weight and the amounts of other auxiliary components Mn, Y, V, W, etc. were changed as shown in Table 5. These capacitors were then examined by an accelerated life test (IR life, hour) at a temperature of 200° C. and a voltage of DC 150 volts and determined for $\xi_s$ at 25° C. and mechanical strength $\sigma_{b3}$ (kgf/mm$^2$), with the results shown in Table 5. Note that sample Nos. 1 to 12 are inventive examples and sample Nos. 13 to 20 are comparative examples.

TABLE 5

| | MnO (wt %) | Y$_2$O$_3$ (wt %) | V$_2$O$_5$ (wt %) | WO$_3$ (wt %) | Al$_2$O$_3$ (wt %) | others (wt %) | IR life (h) | $\epsilon_s$ (25° C.) | Strength $\sigma_{b3}$ (kgf/mm$^2$) |
|---|---|---|---|---|---|---|---|---|---|
| Sample 1 | 0.2 | 0.1 | 0.04 | 0.05 | 0.10 | | 56.6 | 15300 | 15.4 |
| Sample 2 | 0.2 | 0.2 | 0.04 | 0.05 | 0.10 | | 78.6 | 14200 | 14.7 |
| Sample 3 | 0.2 | 0.3 | 0.04 | 0.05 | 0.10 | | 95.0 | 12700 | 14.2 |
| Sample 4 | 0.2 | 0.4 | 0.04 | 0.05 | 0.10 | | 86.6 | 10150 | 13.2 |
| Sample 5 | 0.1 | 0.3 | 0.04 | 0.05 | 0.10 | | 87.3 | 12900 | 13.5 |
| Sample 6 | 0.3 | 0.3 | 0.04 | 0.05 | 0.10 | | 102.1 | 11800 | 14.9 |
| Sample 7 | 0.2 | 0.3 | 0.04 | 0.05 | 0.10 | MoO$_3$ 0.05 | 74.7 | 13800 | 13.8 |
| Sample 8 | 0.2 | 0.3 | 0.01 | 0.05 | 0.10 | | 57.9 | 13500 | 14.3 |
| Sample 9 | 0.2 | 0.3 | 0.1 | 0.05 | 0.10 | | 97.5 | 10800 | 13.4 |
| Sample 10 | 0.2 | 0.3 | 0.2 | 0.05 | 0.10 | | 54.7 | 8700 | 12.9 |
| Sample 11 | 0.2 | 0.3 | 0.04 | 0.01 | 0.10 | | 66.9 | 12500 | 14.0 |
| Sample 12 | 0.2 | 0.3 | 0.04 | 0.1 | 0.10 | | 90.4 | 11900 | 14.3 |
| Sample 13 | 0.2 | 0 | 0 | 0 | 0.10 | | 0.04 | 18300 | 15.5 |
| Sample 14 | 0.2 | 0.3 | 0 | 0 | 0.10 | | 15.2 | 15000 | 14.5 |
| Sample 15 | 0.2 | 0 | 0.04 | 0.05 | 0.10 | | 0.26 | 16900 | 15.3 |
| Sample 16 | 0 | 0.3 | 0.04 | 0.05 | 0.10 | | 0.01 | 3500 | 7.1 |
| Sample 17 | 1.0 | 0.3 | 0.04 | 0.05 | 0.10 | | 20.8 | 6700 | 11.2 |
| Sample 18 | 0.2 | 0.3 | 0.75 | 0.05 | 0.10 | | 10.0 | 5300 | 12.1 |
| Sample 19 | 0.2 | 0.8 | 0.04 | 0.05 | 0.10 | | 13.3 | 6400 | 11.6 |
| Sample 20 | 0.2 | 1.0 | 1.0 | 1.0 | 0.10 | | 4.1 | 4300 | 10.5 |

As seen from Table 5, the inventive samples had an IR life of 54.7 hours at minimum whereas the comparative samples had an IR life as short as 20.8 hours at maximum, indicating the advantages of the invention.

We claim:

1. A multilayer ceramic chip capacitor having internal electrodes and dielectric layers, characterized in that a dielectric material containing a dielectric oxide having a composition of the following formula:

$$[(Ba_{1-x-y}Ca_xSr_y)O]_m(Ti_{1-z}Zr_z)O_2$$

wherein $0 \leq x \leq 0.25$, $0 \leq y \leq 0.05$, $0.1 \leq z \leq 0.3$, and $1.000 \leq m \leq 1.020$ and having added thereto an oxide of Mn and/or a compound which converts to the oxide upon firing in an amount of 0.01 to 0.5% by weight calculated as oxide (MnO), an oxide of Y and/or a compound which converts to the oxide upon firing in an amount of 0.05 to 0.5% by weight calculated as oxide ($Y_2O_3$), an oxide of V and/or a compound which converts to the oxide upon firing in an amount of 0.005 to 0.3% by weight calculated as oxide ($V_2O_5$), and an oxide of W and/or a compound which converts to the oxide upon firing in an amount of 0.005 to 0.3% by weight calculated as oxide ($WO_3$), and an internal electrode-forming material in the form of Ni or a Ni alloy are successively layered and co-fired.

2. The multilayer ceramic chip capacitor of claim 1 wherein the dielectric material has further added thereto up to 0.25% by weight of $SiO_2$.

3. The multilayer ceramic chip capacitor of claim 1 or 2 wherein the dielectric material has further added thereto at least one oxide of Eu and Mo and/or a compound which converts to the oxide upon firing in an amount of up to 0.3% by weight calculated as oxide.

4. The multilayer ceramic chip capacitor of claim 1 wherein each said dielectric layer consists of grains and a grain boundary phase and the ratio of the area of the grain boundary phase in a cross section of said dielectric layer is up to 2%.

5. The multilayer ceramic chip capacitor of claim 4 wherein said grain boundary phase is an oxide phase containing oxides of Mn, Y, V and W.

6. A multilayer ceramic chip capacitor which is prepared by successively layering and co-firing a dielectric material having additives added to a matrix of the following formula:

$$[(Ba_{1-x-y}Ca_xSr_y)O]_m(Ti_{1-z}Zr_z)O_2$$

wherein $0 \leq x \leq 0.25$, $0 \leq y \leq 0.05$, $0.1 \leq z \leq 0.3$, and $1.000 \leq m \leq 1.020$, said additives including an oxide of Mn and/or a compound which converts to the oxide upon firing, an oxide of Y and/or a compound which converts to the oxide upon firing, an oxide of V and/or a compound which converts to the oxide upon firing, and an oxide of W and/or a compound which converts to the oxide upon firing, and an internal electrode-forming material in the form of Ni or a Ni alloy, wherein said additive powders have a mean particle size of up to 3 μm.

7. The multilayer ceramic chip capacitor of claim 6 wherein said additive powders have a maximum particle size of up to 5 μm.

8. The multilayer ceramic chip capacitor of claim 6 or 7 wherein said additives have a mean particle size which is within 5 times the mean particle size of the matrix.

9. The multilayer ceramic chip capacitor of claim 8 wherein said additives have a mean particle size which is within 3 times the mean particle size of the matrix.

10. The multilayer ceramic chip capacitor of claim 6 or 7 wherein said additives have a maximum particle size which is within 3 times the maximum particle size of the matrix.

11. The multilayer ceramic chip capacitor of claim 6 wherein said oxide of Mn and/or said compound which converts to the oxide upon firing is added in an amount of 0.01 to 0.5% by weight calculated as oxide (MnO), said oxide of Y and/or said compound which converts to the oxide upon firing is added in an amount of 0.05 to 0.5% by weight calculated as oxide ($Y_2O_3$), said oxide of V and/or said compound which converts to the oxide upon firing is added in an amount of 0.005 to 0.3% by weight calculated as oxide ($V_2O_5$), and said oxide of W and/or said compound which converts to the oxide upon firing is added in an amount of 0.005 to 0.3% by weight calculated as oxide ($WO_3$).

12. The multilayer ceramic chip capacitor of claim 6 or 11 wherein the dielectric material has further added thereto up to 0.25% by weight of $SiO_2$.

13. The multilayer ceramic chip capacitor of claim 6, 11 or 12 wherein the dielectric material has further added thereto at least one oxide of Eu and Mo and/or a compound which converts to the oxide upon firing in an amount of up to 0.3% by weight calculated as oxide.

14. The multilayer ceramic chip capacitor of claim 6 wherein each said dielectric layer consists of grains and a grain boundary phase and the ratio of the area of the grain boundary phase in a cross section of said dielectric layer is up to 2%.

15. The multilayer ceramic chip capacitor of claim 14 wherein said grain boundary phase is an oxide phase containing oxides of Mn, Y, V and W.

16. A multilayer ceramic chip capacitor which is prepared by successively layering and co-firing a dielectric material having additives added to a matrix of the following formula:

$$[(Ba_{1-x-y}Ca_xSr_y)O]_m(Ti_{1-z}Zr_z)O_2$$

wherein $0 \leq x \leq 0.25$, $0 \leq y \leq 0.05$, $0.1 \leq z \leq 0.3$, and $1.000 \leq m \leq 1.020$, said additives including an oxide of Mn and/or a compound which converts to the oxide upon firing, an oxide of Y and/or a compound which converts to the oxide upon firing, an oxide of V and/or a compound which converts to the oxide upon firing, an oxide of W and/or a compound which converts to the oxide upon firing, and $Al_2O_3$ sintering aid, and an internal electrode-forming material in the form of Ni or a Ni alloy.

17. The multilayer ceramic chip capacitor of claim 16 wherein the $Al_2O_3$ sintering aid is added in an amount of 0.005 to 0.5% by weight.

18. The multilayer ceramic chip capacitor of claim 16 wherein the $Al_2O_3$ sintering aid is added in an amount of 0.01 to 0.3% by weight.

19. The multilayer ceramic chip capacitor of claim 16 wherein the $Al_2O_3$ sintering aid is added in an amount of 0.01 to 0.15% by weight.

20. The multilayer ceramic chip capacitor of claim 16 wherein said oxide of Mn and/or said compound which converts to the oxide upon firing is added in an amount of 0.01 to 0.5% by weight calculated as oxide (MnO), said oxide of Y and/or said compound which converts to the oxide upon firing is added in an amount of 0.05 to 0.5% by weight calculated as oxide ($Y_2O_3$), said oxide of V and/or said compound which converts to the oxide upon firing is added in an amount of 0.005 to 0.3% by weight calculated as oxide ($V_2O_5$), and said oxide of W and/or said compound which converts to the oxide upon firing is added in an amount of 0.005 to 0.3% by weight calculated as oxide ($WO_3$).

21. The multilayer ceramic chip capacitor of claim 16 or 20 wherein the dielectric material has further added thereto at least one oxide of Eu and Mo and/or a compound which converts to the oxide upon firing in an amount of up to 0.3% by weight calculated as oxide.

22. The multilayer ceramic chip capacitor of claim 16 wherein each said dielectric layer consists of grains and a grain boundary phase and the ratio of the area of the grain boundary phase in a cross section of said dielectric layer is up to 2%.

23. The multilayer ceramic chip capacitor of claim 22 wherein said grain boundary phase is an oxide phase containing oxides of Mn, Y, V and W.

* * * * *